(12) United States Patent
Sautter et al.

(10) Patent No.: US 8,490,847 B2
(45) Date of Patent: Jul. 23, 2013

(54) HITCH MOUNTED ARTICLE CARRIERS FOR VEHICLES

(75) Inventors: Chris Sautter, Portland, OR (US); Mike Kemery, Portland, OR (US); Zac Elder, Portland, OR (US); Andrew Austin, Portland, OR (US); Richard Jeli, Portland, OR (US); Aaron Foley, Campbell, CA (US); Steve Rodden, Portland, OR (US)

(73) Assignee: Yakima Innovation Development Corporation, Georgetown, Grand Cayman (KY)

( * ) Notice: Subject to any disclaimer, the term of this patent is extended or adjusted under 35 U.S.C. 154(b) by 0 days.

(21) Appl. No.: 13/532,513

(22) Filed: Jun. 25, 2012

(65) Prior Publication Data
US 2013/0020365 A1    Jan. 24, 2013

Related U.S. Application Data

(63) Continuation of application No. 12/217,771, filed on Jul. 7, 2008, now Pat. No. 8,210,408.

(60) Provisional application No. 60/958,568, filed on Jul. 6, 2007.

(51) Int. Cl.
*G60R 9/06* (2006.01)

(52) U.S. Cl.
USPC ........... 224/497; 224/503; 224/507; 224/509; 224/521; 224/532; 224/537; 224/924

(58) Field of Classification Search
CPC ........................... B65D 2011/0085; B65D 9/10
USPC ......... 224/321, 324, 488, 495, 497, 502–509, 224/511, 512, 519, 521, 532, 534, 536, 537, 224/549, 553, 568, 570, 571, 924; 280/762; 414/462

See application file for complete search history.

(56) References Cited

U.S. PATENT DOCUMENTS

| | | | |
|---|---|---|---|
| 5,094,373 A | 3/1992 | Lovci |
| 5,169,042 A | 12/1992 | Ching |
| 5,190,195 A | 3/1993 | Fullhart et al. |
| 5,259,542 A | 11/1993 | Newbold et al. |
| 5,664,717 A | 9/1997 | Joder |
| 5,685,686 A | 11/1997 | Burns |
| 5,730,345 A | 3/1998 | Yeckley et al. |

(Continued)

OTHER PUBLICATIONS

US Patent and Trademark Office, Office Action regarding U.S. Appl. No. 12/217,772, Jun. 14, 2011, 8 pages.

(Continued)

*Primary Examiner* — Gary Elkins
(74) *Attorney, Agent, or Firm* — Kolisch Hartwell, P.C.

(57) ABSTRACT

An article carrier configured to be detachably mounted to a trailer hitch of a vehicle is disclosed. The article carrier may include a frame having first and second end portions with the first end portion being pivotably mounted to the base allowing the frame to be selectively pivoted about a first axis between a substantially vertical position in which the frame extends upwardly from the base, and a substantially horizontal position in which the frame extends sidewardly from the base, the first axis being parallel to a longitudinal axis of the vehicle; and a carrier assembly connected to the second end portion of the frame and configured to support one or more articles.

17 Claims, 9 Drawing Sheets

U.S. PATENT DOCUMENTS

| | | |
|---|---|---|
| 5,775,560 A | 7/1998 | Zahn et al. |
| 5,931,362 A | 8/1999 | Chimenti |
| 5,950,891 A | 9/1999 | Brungardt et al. |
| 5,992,720 A | 11/1999 | Miller |
| 6,206,259 B1 | 3/2001 | Brungardt et al. |
| 6,283,349 B1 | 9/2001 | Morris et al. |
| 6,286,738 B1 | 9/2001 | Robins et al. |
| 6,321,962 B1 | 11/2001 | Morris et al. |
| 6,386,407 B1 | 5/2002 | Erickson et al. |
| 6,409,065 B1 | 6/2002 | Edgerly |
| 6,467,664 B2 | 10/2002 | Robins et al. |
| 6,616,023 B1 | 9/2003 | Dahl et al. |
| 6,644,525 B1 | 11/2003 | Allen et al. |
| 6,745,926 B2 | 6/2004 | Chimenti |
| 6,840,418 B2 * | 1/2005 | Robins et al. ................ 224/537 |
| 6,918,520 B2 | 7/2005 | Skinner |
| 6,974,147 B1 | 12/2005 | Kolda |
| 6,988,645 B1 | 1/2006 | Nusbaum et al. |
| 7,055,725 B1 | 6/2006 | Kolda |
| 7,213,731 B1 | 5/2007 | Kolda |
| 8,210,408 B2 | 7/2012 | Sautter et al. |
| 8,235,268 B2 | 8/2012 | Sautter et al. |
| 2002/0003156 A1 * | 1/2002 | Morris et al. ................ 224/553 |
| 2005/0061842 A1 | 3/2005 | Tsai |
| 2006/0091173 A1 | 5/2006 | Morales et al. |
| 2006/0131354 A1 * | 6/2006 | Huang ................ 224/495 |
| 2006/0237504 A1 | 10/2006 | Settelmayer et al. |
| 2006/0273125 A1 | 12/2006 | Bogoslofski et al. |
| 2007/0057001 A1 | 3/2007 | Wang |
| 2008/0093404 A1 | 4/2008 | Clausen et al. |

OTHER PUBLICATIONS

US Patent and Trademark Office, Office Action regarding U.S. Appl. No. 12/217,772, Feb. 16, 2012, 13 pages.

* cited by examiner

HITCH MOUNTED ARTICLE CARRIERS FOR VEHICLES

CROSS-REFERENCE TO RELATED APPLICATIONS

This application is a continuation of U.S. patent application Ser. No. 12/217,771 filed Jul. 7, 2008 which claims priority under 35 U.S.C. §119(e) to U.S. Provisional Patent Application Ser. No. 60/958,568 entitled "Mast Style Hitch Mounted Racks for Vehicles," filed Jul. 6, 2007, both of which are herein incorporated by reference in their entireties for all purposes.

This application also incorporates by reference for all purposes the complete disclosures of U.S. Pat. Nos. 5,190,195; 5,664,717; 5,950,891; 6,206,259; 6,283,349; 6,321,962; 6,409,065; 6,644,525; and 6,745,926; and U.S. patent application Ser. Nos. 2006/0273125 and 2006/0237504.

BACKGROUND

Vehicle carrier racks are typically mounted on the exterior of a motor vehicle to support bicycles, skis, surf boards, kayaks, etc., above the ground. These racks are generally constructed of rigid frame members having arms extending horizontally therefrom for supporting objects. Various types of carrier racks are available that may be mounted either to the roof, to the trunk, and/or to the rear hitch of the vehicle.

One type of rack, for example, generally used for carrying one or more bicycles adjacent to the rear of a vehicle, is mountable on the rear hitch of the vehicle. Hitch mounted racks include a hitch coupling member adapted to securely attach to the rear hitch of the vehicle. An elongated and generally upright mast extends upward from the coupling member adjacent the rear of the vehicle. Two load-carrying support arms extend outward and rearward from the upper end of the mast. The support members typically include securing devices adapted to fasten bike frames to the rack.

SUMMARY

Some embodiments provide an article carrier configured to be detachably mounted to a trailer hitch of a vehicle, the vehicle having a longitudinal axis. The article carrier includes a base having a connector configured to be detachably mounted to the trailer hitch; a frame having first and second end portions with the first end portion being pivotably mounted to the base allowing the frame to be selectively pivoted about a first axis between a substantially vertical position in which the frame extends upwardly from the base, and a substantially horizontal position in which the frame extends sidewardly from the base, the first axis being parallel to the longitudinal axis of the vehicle; and a carrier assembly connected to the second end portion of the frame and configured to support one or more articles.

In some embodiments, the article carrier includes a base having a connector configured to be detachably mounted to the trailer hitch; a frame having first and second end portions with the first end portion being pivotably mounted to the base allowing the frame to be selectively pivoted about a first axis between a substantially vertical position in which the frame extends upwardly from the base, and a substantially horizontal position in which the frame extends sidewardly from the base, the first axis being parallel to the longitudinal axis of the vehicle; and a carrier assembly configured to support one or more articles, wherein the carrier assembly is pivotably connected to the second end portion of the frame and configured to pivot about a second axis between a stowed position in which the carrier assembly is parallel to the frame, and an extended position in which the carrier assembly is perpendicular to the frame.

In some embodiments, the bicycle carrier may include a base having a connector configured to be detachably mounted to the trailer hitch; a frame having first and second end portions with the first end portion being pivotably mounted to the base allowing the frame to be selectively pivoted about a first axis between a substantially vertical position in which the frame extends upwardly from the base, and a substantially horizontal position in which the frame extends sidewardly from the base, the first axis being parallel to the longitudinal axis of the vehicle; and a carrier assembly connected to the second end portion of the frame and configured to support one or more bicycles, the carrier assembly including a pair of arms configured to support the one or more articles, each of the pair of arms including a top portion having a plurality of depressions sized to receive a portion of an article, and a bottom portion having a slot, and wherein the pair of arms is pivotably connected to the second end portion of the frame and configured to pivot between a stowed position in which the pair of arms is parallel to the frame, and an extended position in which the pair of arms is perpendicular to the frame.

DETAILED DESCRIPTION

Figure 1:
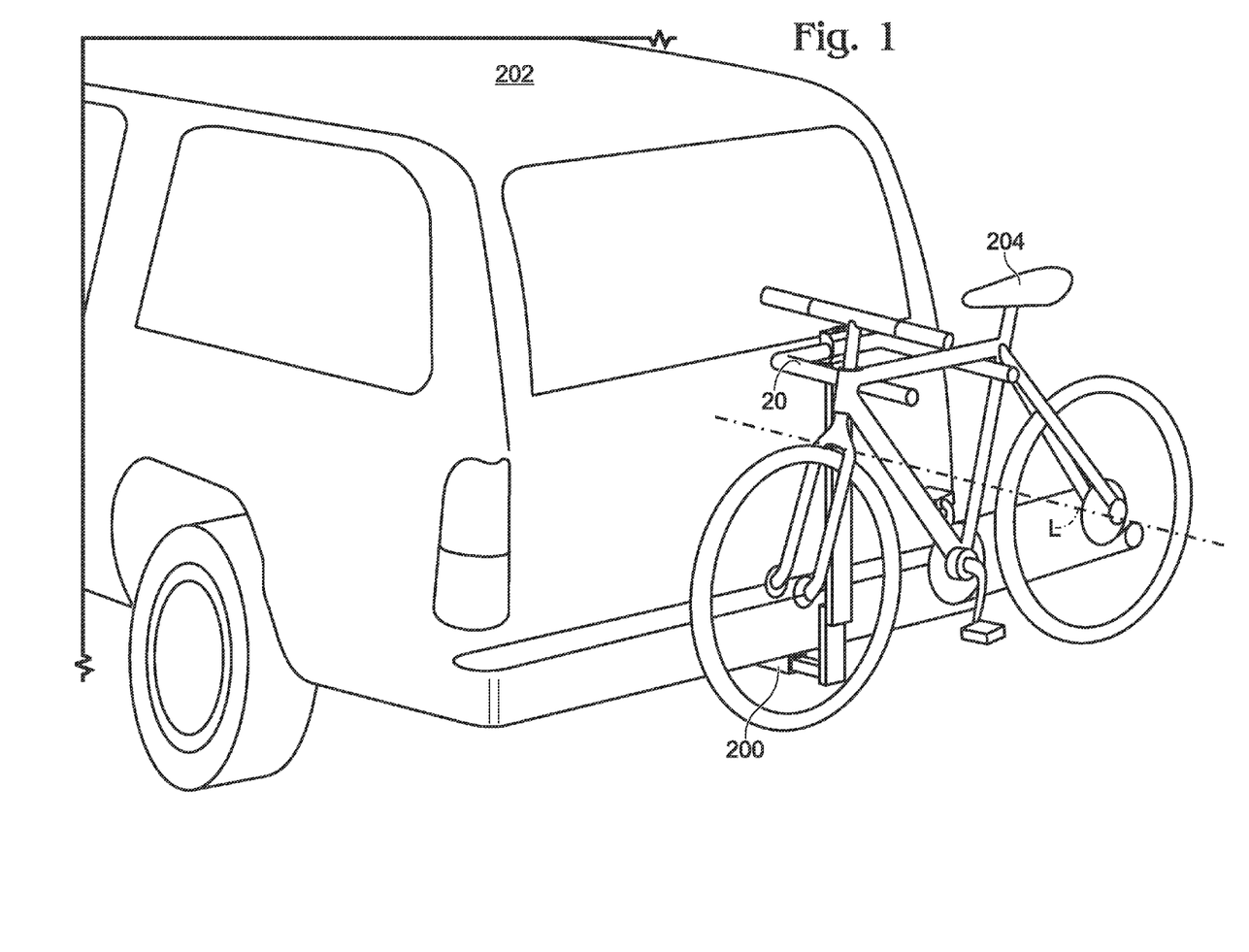
FIG. 1 is an isometric view of an article carrier attached to a rear hitch of a vehicle shown supporting a bicycle.

FIG. 1 depicts an article carrier 20, which includes any suitable structure configured to be mounted on a rear or trailer hitch 200 of a vehicle 202 having a longitudinal axis L, for carrying one or more articles 204 adjacent to a rear portion of a vehicle. Any suitable type(s) of articles may be carried by article carrier 20, such as bicycles, skis, snowboards, kayaks, luggage, bags, etc. When article carrier 20 is configured to support bicycles, the article carrier may be referred to as a "bicycle carrier."

Figure 2:
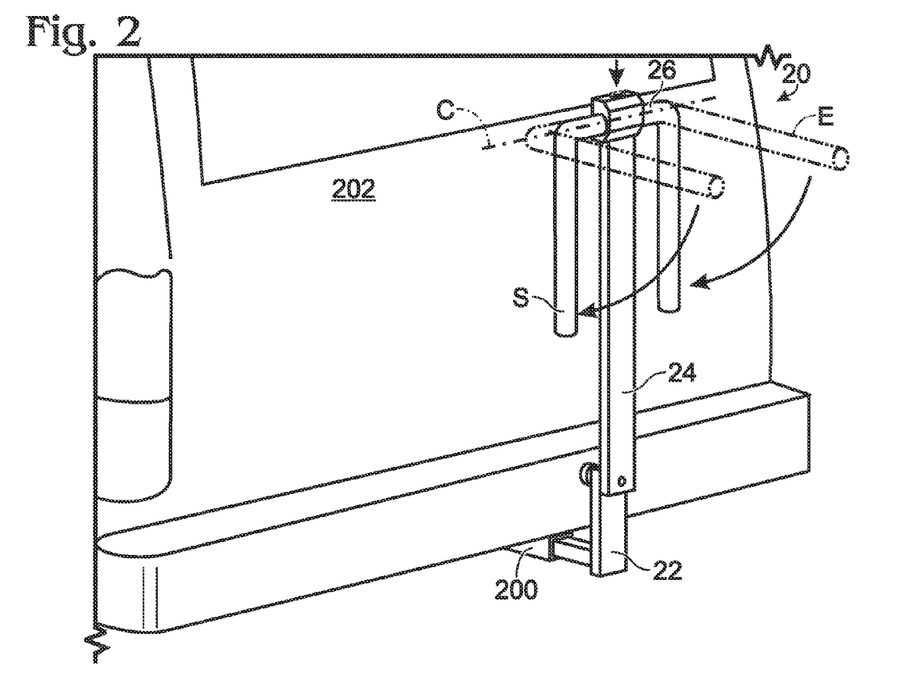
FIG. 2 is an isometric view of the article carrier of FIG. 1 showing the adjustability of a carrier assembly of the rack between an extended position and a stowed position.
Figure 3:
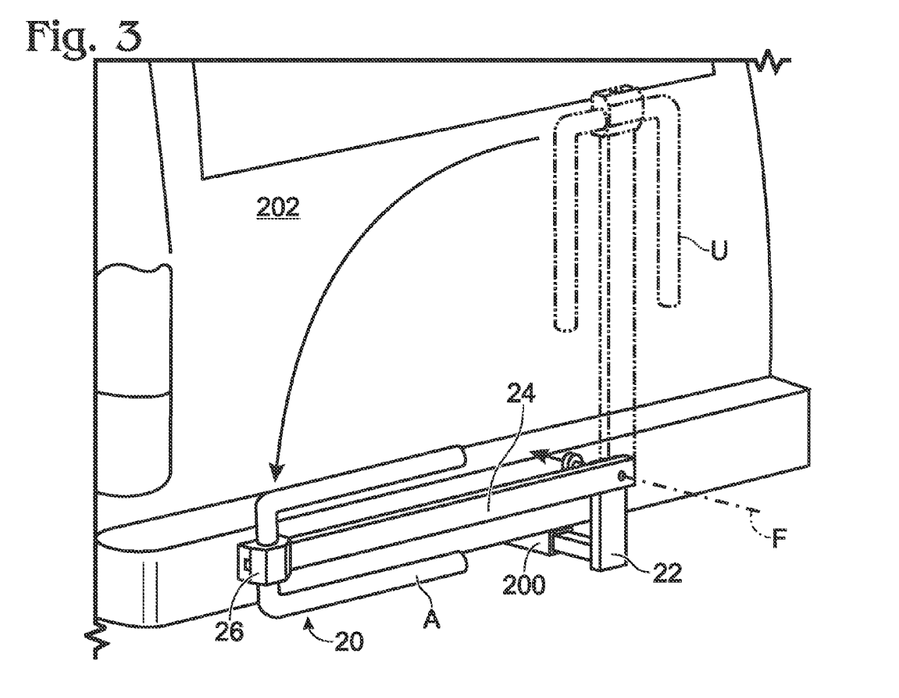
FIG. 3 is an isometric view of the article carrier of FIG. 1 showing the adjustability of a frame of the rack between a use position and an access position.

Article carrier 20 includes base 22, frame (or mast) 24, and carrier assembly 26, as shown in FIGS. 2-3. Carrier assembly 26 may be movably connected to frame 24 allowing the carrier assembly to be selectively moved among a plurality of positions. For example, carrier assembly 26 may be pivotably mounted to the frame allowing the carrier assembly to be selectively pivoted about a carrier axis C between a stowed position S in which the carrier assembly is adjacent the frame, and an extended position E in which the carrier assembly is spaced from the frame relative to the stowed position, as shown in FIG. 2. In some embodiments, the carrier assembly may be parallel to the frame in the stowed position and/or may be perpendicular to the frame in the extended position.

Similarly, frame 24 may be movably connected to base 22 allowing the frame to be selectively moved among a plurality of positions. For example, frame 24 may be pivotably mounted to the base allowing the frame to be selectively pivoted about a frame axis F between a use position (or a substantially vertical position) U in which the frame extends upwardly from the base, and an access position (or a substantially horizontal position) A in which the frame extends sidewardly from the base, as shown in FIG. 3. In some embodiments, the frame axis may be parallel to the longitudinal axis of the vehicle. Additionally, or alternatively, the frame axis may be perpendicular to the carrier axis of the carrier assembly.

Although carrier assembly 26 and frame 24 are shown to be pivotably mounted to the frame and the base, respectively, the carrier assembly and/or the frame may alternatively, or additionally, be mounted or connected to the frame and/or base in any suitable way(s), such as slidably or rotatably connected. Additionally, although the frame axis is shown to be parallel to the longitudinal axis of the vehicle, the frame axis may have any suitable relationship(s) with the longitudinal axis, such as parallel, non-parallel and non-perpendicular, etc. Moreover, although the frame axis is shown to be perpendicular to the carrier axis, the frame and carrier axes may have any suitable relationship(s), such as parallel, non-parallel and non-perpendicular, etc.

Figures 4, 5:
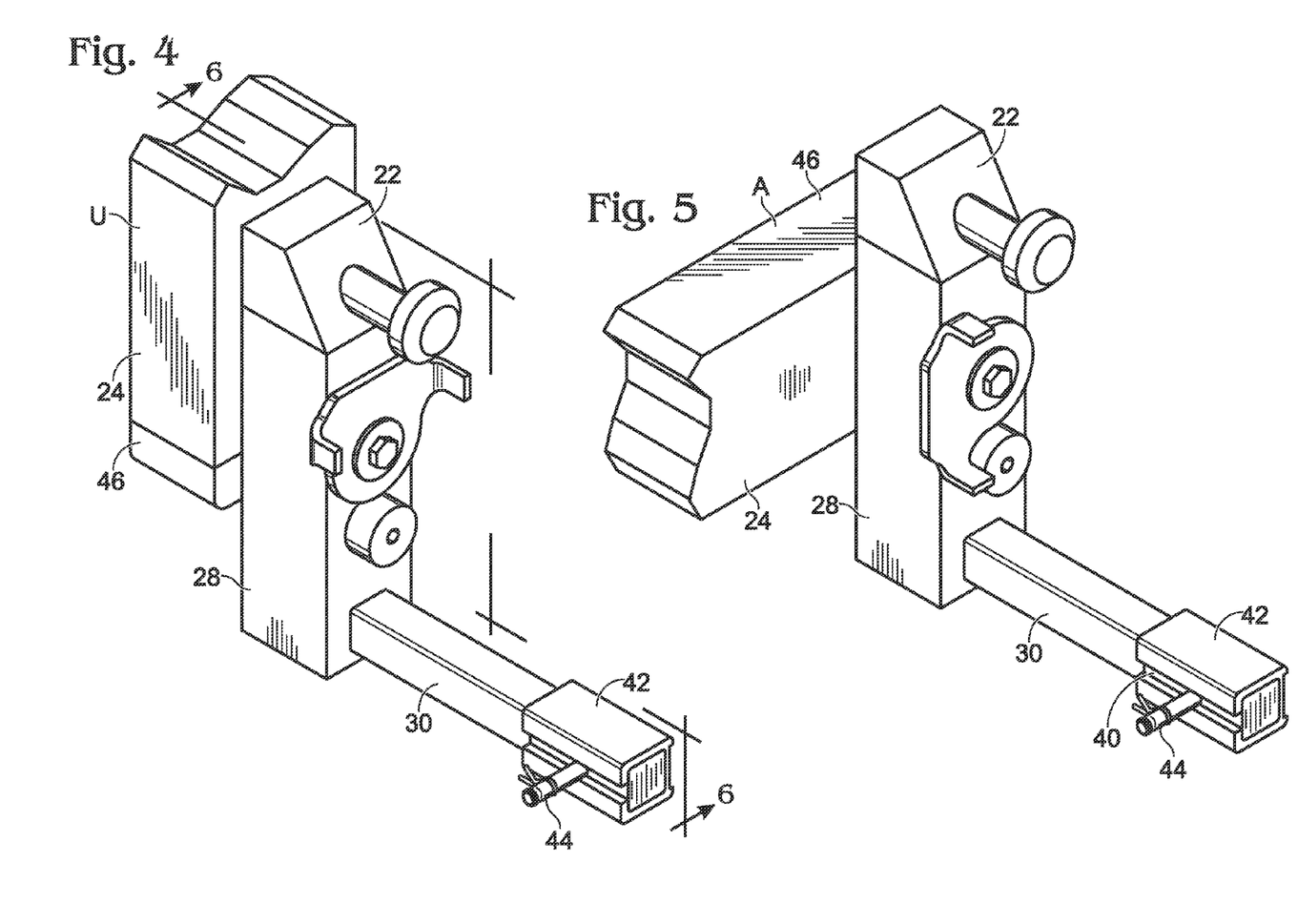
FIG. 4 is a partial isometric view of the article carrier of FIG. 1 showing a frame of the rack in a use position.
FIG. 5 is a partial isometric view of the article carrier of FIG. 1 showing a frame of the rack in an access position.
Figure 6:
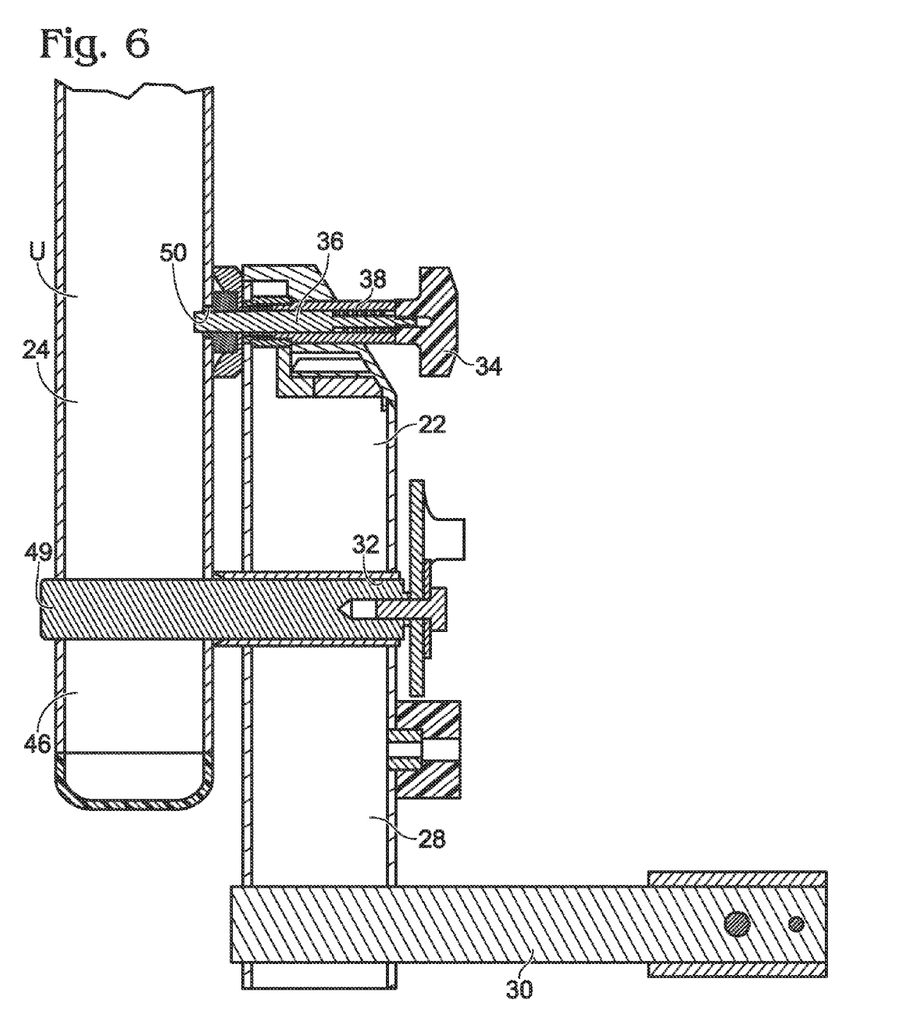
FIG. 6 is a sectional view of the article carrier of FIG. 1 taken along lines 6-6 in FIG. 4, showing a base with a frame locking mechanism to secure a frame in a use position.

Base 22 may include any suitable structure configured to be mounted to rear or trailer hitch 200 of vehicle 202 and/or allow frame 24 to be selectively pivoted about the frame axis. For example, the base may include a frame pivoting assembly 28 and a bar 30, as shown in FIGS. 4-5. The frame pivoting assembly may include any suitable structure configured to allow frame 24 to be selectively pivoted. For example, frame pivoting assembly 28 may include a base aperture 32 and a frame locking mechanism 34, as shown in FIG. 6. The base aperture may be configured to receive an axle of the frame and/or may allow the frame to pivot about the frame axis.

Frame locking mechanism 34 may include a frame locking member 36 and a frame bias element 38, as shown in FIG. 6. The frame locking member may be configured to be selectively received within a locking aperture of the frame to lock the frame in the substantially vertical position. Frame bias element 38 may be configured to urge frame locking member 36 toward the locking aperture of the frame.

Bar 30 may include any suitable structure configured to be mounted to the rear hitch of a vehicle. For example, the bar may include a connector or connector portion 40 configured to be detachably mounted to the rear hitch. In some embodiments, base 22 also may include an adapter 42 that wraps around the bar and a securing member 44 (such as a bolt or screw) that selectively secures the adapter to the bar, as shown in FIGS. 4-5. The adapter may be any suitable shape, such as a C-shape that wraps around the bar.

Figure 7:
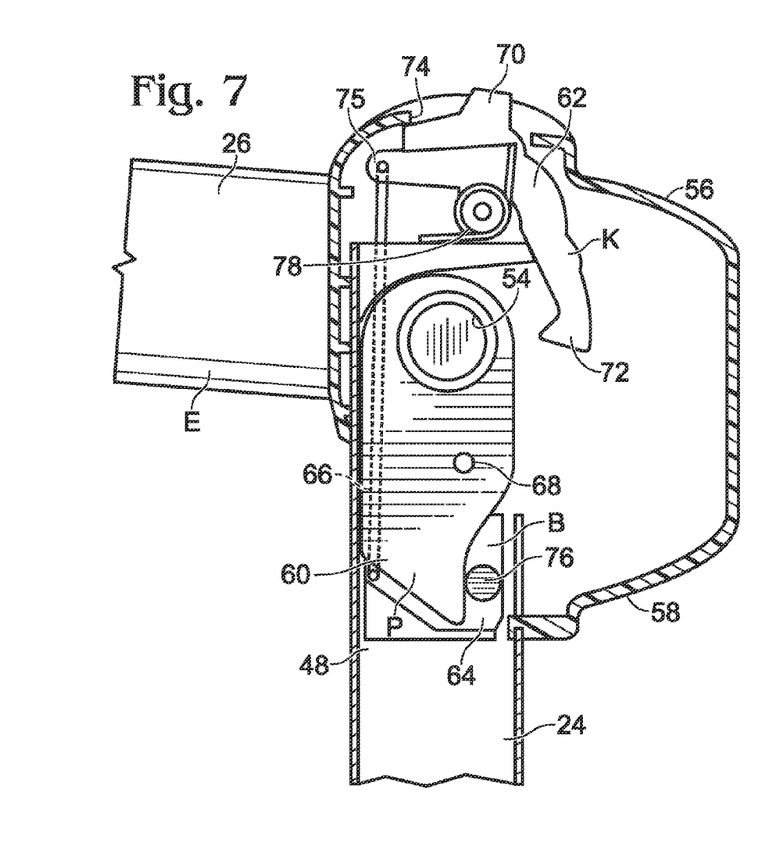
FIGS. 7-10 are sectional views of the article carrier of FIG. 1 taken along lines 7-7 in FIG. 11, showing movement of the carrier assembly of FIG. 1 between an extended position and a stowed position.
Figure 8:
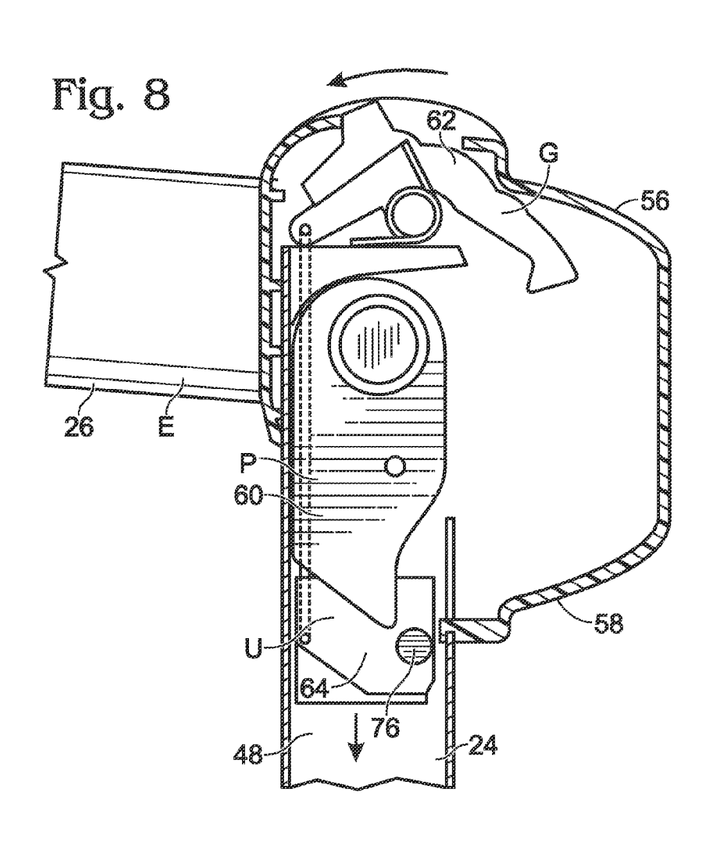

Frame 24 may include any suitable structure configured to connect the base to the carrier assembly, and/or allow carrier assembly 26 to be selectively pivoted about the carrier axis. For example, the frame may include a first end portion 46 and a second end portion 48, as shown in FIGS. 6-7. The first end portion may be pivotably mounted to the base via a frame pivoting connector (or frame axle) 49. Additionally, first end portion 46 may include a locking aperture 50 sized to receive frame locking member 36 of the base, as shown in FIG. 6.

Second end portion 48 may include a frame aperture 54 and a carrier locking mechanism 56, as shown in FIG. 7. The frame aperture may be configured to receive an axle of the carrier assembly and/or allow the carrier assembly to pivot about the carrier axis. The carrier locking mechanism may include any suitable structure configured to secure carrier assembly 26 in one or more positions, such as the stowed and/or extended positions. For example, carrier locking mechanism 56 may include a housing 58, a first locking member (or fin) 60, a second locking member (or trigger) 62, a third locking member (or latch box) 64, and a link 66, as shown in FIG. 7. Housing 58 may be configured to support at least most of the other components of carrier locking mechanism 56.

Figure 10:
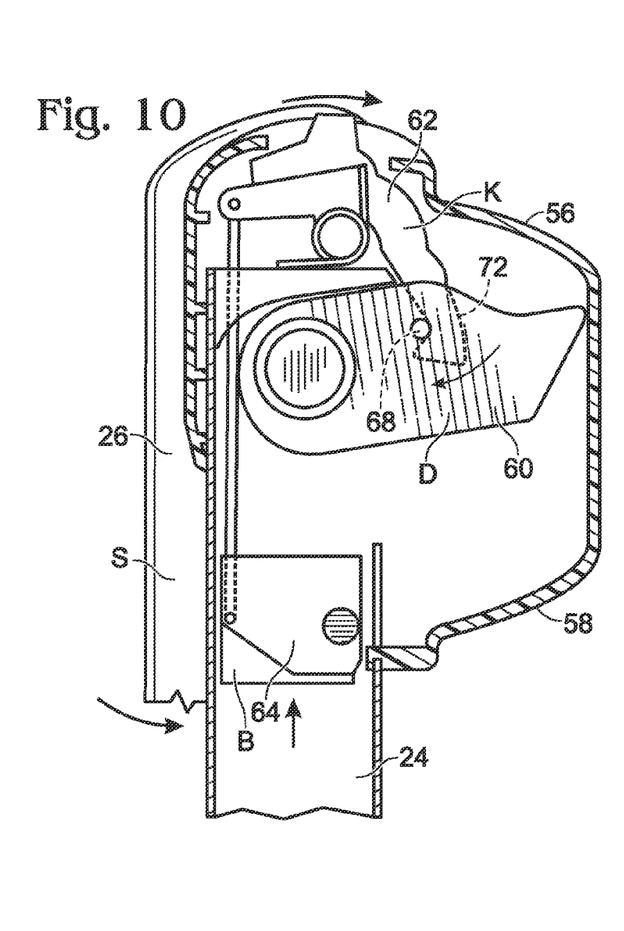

The first locking member may be attached to the carrier pivoting connector and may move or pivot with the carrier assembly. For example, the first locking member may move or pivot between a first position P in which the first locking member is adjacent the third locking member when the carrier assembly is in extended position E (shown in FIG. 7), and a second position D in which the first locking members in spaced from the third locking member relative to the proximal position when the carrier assembly is in stowed position S (shown in FIG. 10). First locking member 60 may include a first pin (or first pin portion) 68.

Figure 9:
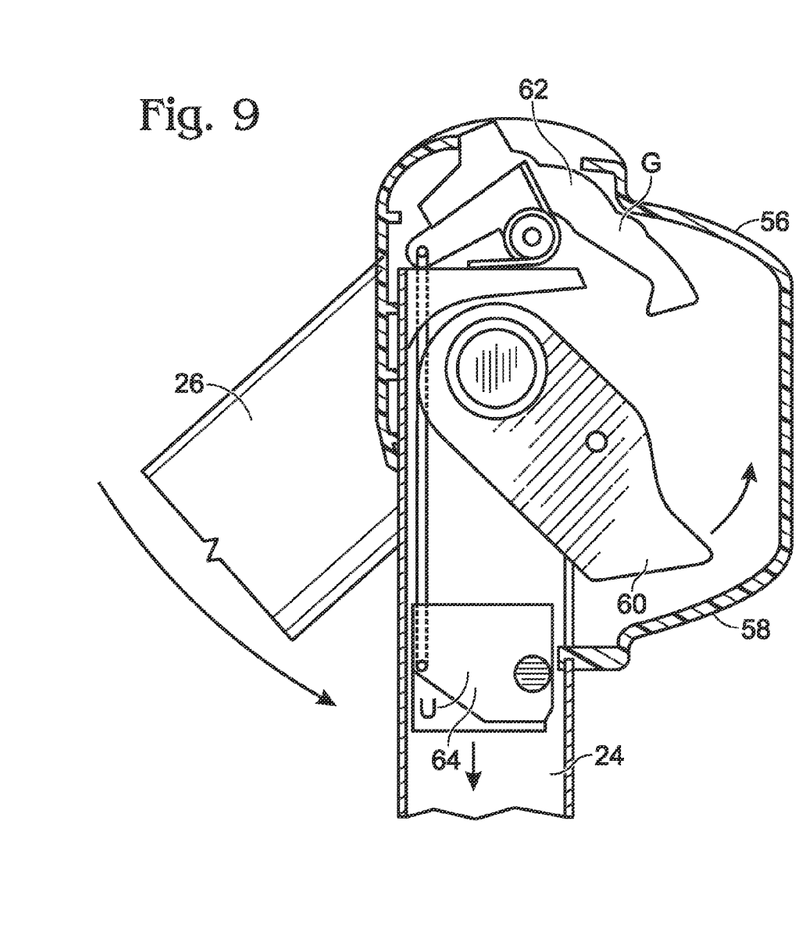

Second locking member 62 may be pivotably connected to the housing and may be configured to move or pivot between a third position K in which the second locking member prevents the first locking member from moving from the second position toward the first position (shown in FIG. 10), and a fourth position G in which the second locking member is spaced from the first locking member allowing the first locking member to move from the second position toward the first position (shown in FIG. 9). The second locking member may include a user manipulable portion 70 and a hook or hook portion 72, as shown in FIG. 7. The manipulable portion may be accessible through an opening 74 in the housing to allow a user to pivot the second locking member between the third and fourth positions. Hook 72 may be configured to engage first pin 68 to secure the first locking member in the distal position.

Third locking member 64 may be operatively connected to an end portion 75 of second locking member 62 via link 66 such that the third locking member may move or slide between a blocking position B and an unblocking position N when the second locking member moves between third position K and fourth position G, as shown in FIGS. 7-10. In the blocking position, the third locking member may prevent the first locking member from moving from first position P toward second position D (shown in FIG. 7). In the unblocking position, the third locking member may be spaced from the first locking member relative to the blocking position allowing the first locking member to move from the first position to the second position (shown in FIG. 8).

The third locking member may include a second pin or pin portion 76. In some embodiments, carrier locking mechanism 56 may include a bias element 78 configured to urge second locking member 62 toward the third position, which may urge third locking member 64 toward the blocking position via link 66. Although the first and second locking members are shown to pivot and the third locking members is shown to slide, those locking members may alternatively, or additionally, move in any suitable way(s). Additionally, although the first, second, and third locking members are shown to be unitary pieces, one or more of those members may include two or more components.

Carrier assembly 26 may include any suitable structure connected to the second end portion of the frame and/or configured to support one or more articles. For example, the carrier assembly may include a carrier pivoting connector (or carrier axle) 80, at least one arm 82, at least one arm cap 84, and at least one restraining assembly 86. The carrier pivoting connector may connect two or more arms 82 and may be received within carrier aperture 54 of frame 24 such that carrier assembly may pivot relative to the frame.

Figures 11, 12:
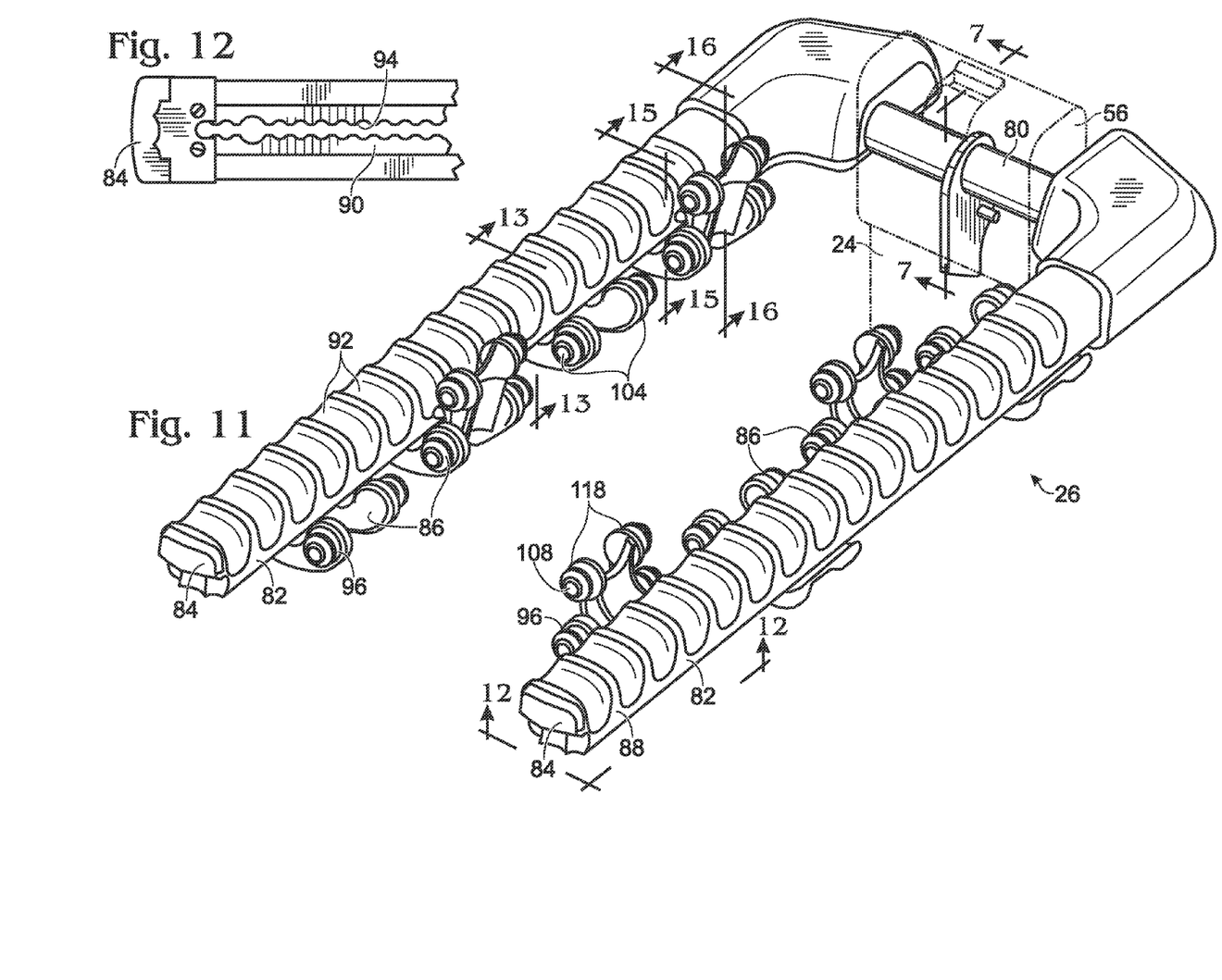
FIG. 11 is a partial isometric view of the article carrier of FIG. 1 showing a carrier assembly of the rack in an extended position.
FIG. 12 is a partial bottom view of the carrier assembly of FIG. 11, showing a slot on a bottom portion of an arm of the carrier assembly.

Arm 82 may include a top portion 88 and a bottom portion 90. The top portion may include a plurality of depressions (or cradle surfaces) 92 sized to receive at least one portion of one or more articles, as shown in FIG. 11. The arm may have any suitable number of depressions. Additionally, the depressions may be formed with the arm or may be part of an arm pad or another separate component that is attached to the arm.

Bottom portion 90 includes a slot 94 configured to slidably receive the restraining assembly. The slot may be contoured, curvilinear, and/or rectilinear to retain the restraining assembly. Although carrier assembly 26 is shown to include two arms or pair of arms 82, the carrier assembly may include any suitable number of arms. For example, the carrier assembly may include a single arm or three arms. Arm cap 84 may be attached to an end portion of arm 82. The arm cap may retain the arm pad and/or may protect the end portion of the arm. In some embodiments, arm cap 84 may include a beverage container opener, such as a bottle opener (not shown).

Restraining assembly 86 may include any suitable structure configured to move or slide along at least a substantial portion of the bottom portion of the arm and/or to secure at least one portion of the article on one or more of the depressions of the top portion. The ability of the restraining assembly to be moved or slid along the arm may allow a user to selectively adjust spacing among two or more articles supported on the carrier assembly. Carrier assembly 26 may include any suitable number of restraining assemblies. For example, the carrier assembly is shown to include four restraining assemblies on each arm in FIG. 11.

Figures 13, 15, 16, 17:
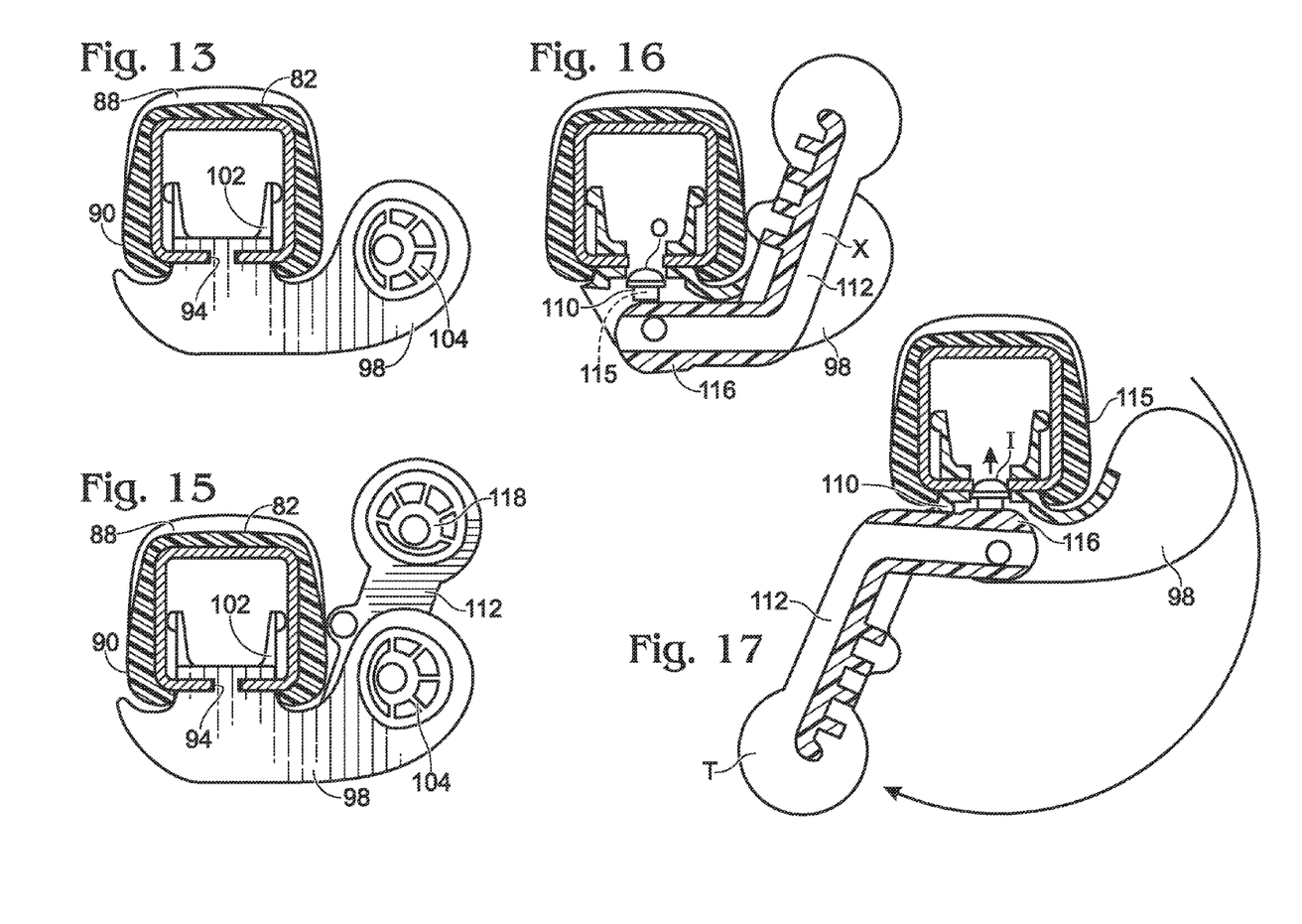
FIG. 13 is a sectional view of the carrier assembly of FIG. 11 taken along lines 13-13 in FIG. 11, showing an example of a restraining assembly without an adjustable strap.
FIG. 15 is a sectional view of the carrier assembly of FIG. 11 taken along lines 15-15 in FIG. 11, showing another example of a restraining assembly without an adjustable strap.
FIG. 16 is a sectional view of the carrier assembly of FIG. 11 taken along lines 16-16 in FIG. 11, showing the restraining assembly of FIG. 15 with a first restraining mechanism and a second restraining mechanism in a proximal position.
FIG. 17 is the restraining assembly of FIG. 16 with the second restraining mechanism in a distal position.
Figure 14:
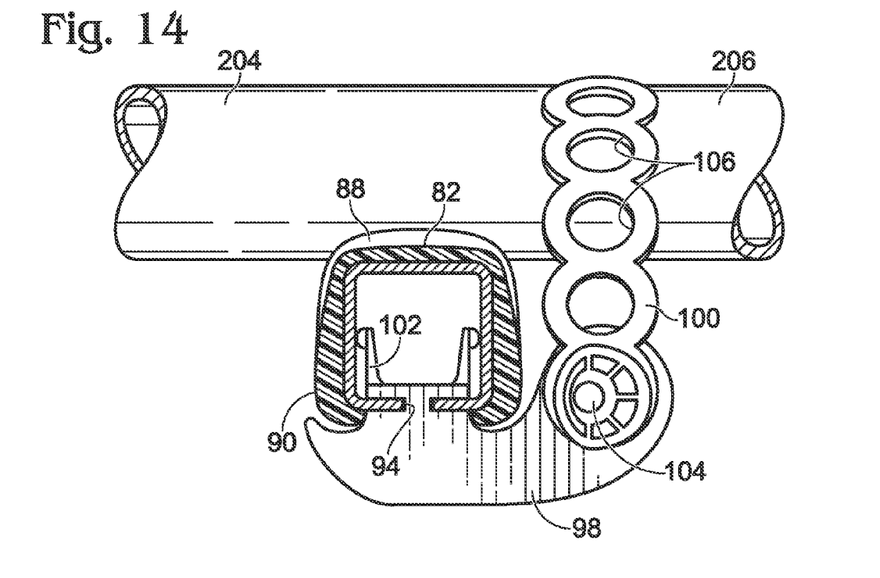
FIG. 14 is a partial view of the restraining assembly of FIG. 13 shown with a portion of a bicycle secured.

The restraining assembly may include a first restraining mechanism 96 configured to secure a first portion of an article on at least one depression of the plurality. The first restraining mechanism may include a first restrainer 98 and a first adjustable strap 100, as shown in FIGS. 13-14. The first restrainer 98 may include a sliding portion 102 and first receiving portions (or fingers) 104, as shown in FIGS. 11 and 13. The sliding portion may be configured to be slidably received in slot 94. First receiving portions 104 may be configured to receive first adjustable strap 100. First strap 100 may be configured to wrap around a first portion 206 of article 204, as shown in FIG. 14. The first strap may include a plurality of first holes 106 with at least some of the holes sized to attach to (or receive) the first receiving portions. When the first restraining mechanism includes a first strap, the first restrainer may sometimes be referred to as a "strap hanger."

Restraining assembly 86 may include a second restraining mechanism 108 configured to secure a second portion of an article to the at least one arm, where the second portion of the article may be spaced from the first portion, as shown in FIG. 11. For example, the second restraining mechanism may include a locking member 110, a second restrainer (or restraining base) 112, and a second adjustable strap 114, as shown in FIGS. 15-18.

Locking member 110 may be slidably received within channel 94 formed by sliding portion 102 of first restrainer 98, and may be configured to move between a locking (or engaged) position I in which the locking member may engage slot 94 to secure the first restraining mechanism to the at least one arm (shown in FIG. 17), and an unlocking (or released) position O in which the locking member may be spaced from the slot allowing the first restraining mechanism to move or slide along the bottom portion of the at least one arm (shown in FIG. 16). The locking member may include any suitable structure, such as a buttonhead screw. In some embodiments, second restraining mechanism 108 may include a lock bias element 115 to urge the locking member toward the locking position.

Second restrainer 112 may be pivotably connected to the first restraining mechanism, such as first restrainer 98, to pivot between a proximal position X in which the second restrainer may be adjacent the first restraining mechanism (shown in FIG. 16), and a distal position T in which the second restrainer may be spaced from the first restraining mechanism relative to the distal position (shown in FIG. 17). Additionally, the second restrainer may be configured to move the locking member from the unlocking position toward the locking position.

Figure 18:
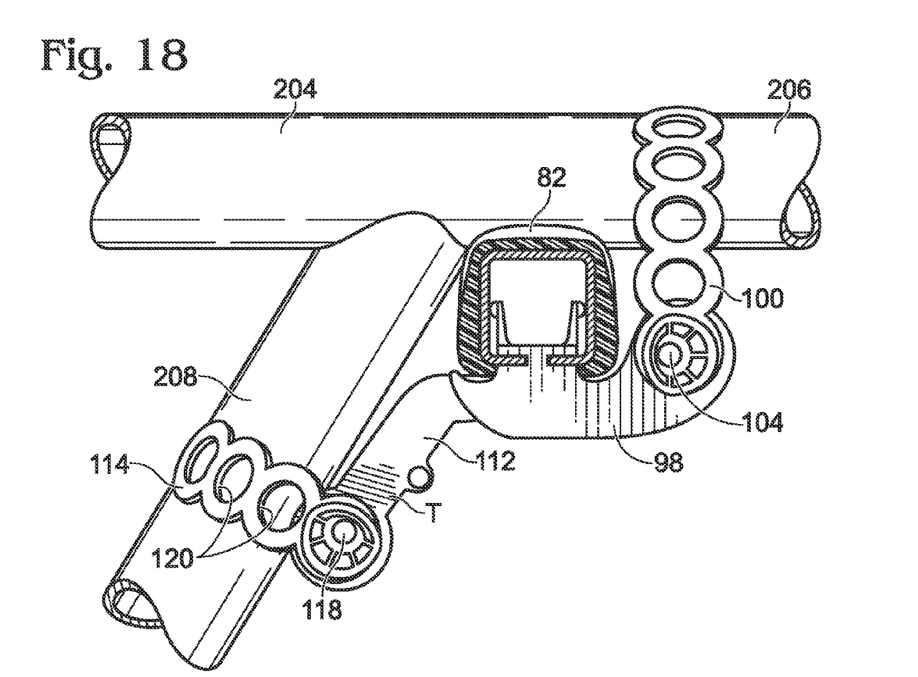
FIG. 18 is a partial view of the restraining assembly of FIG. 15 shown with two portions of a bicycle secured.

Second restrainer 110 may include a cam portion 116 and second receiving portions 118. The cam portion may move the locking member from the unlocking position toward the locking position when the second restrainer is pivoted from the proximal position toward the distal position. Second receiving portions 118 may be configured to receive second adjustable strap 114. Second strap 114 may be configured to partially wrap around a second portion 208 of article 204, as shown in FIG. 18. The second strap may include a plurality of second holes 120 with at least some of the holes sized to attach to (or receive) the second receiving portions. When the second restraining mechanism includes a second strap, the second restrainer may sometimes be referred to as a "stabilizer."

Carrier assembly 26 may include any suitable type(s) of restraining assemblies 86. For example, one or more restraining assemblies may include only the first restraining mechanism, and/or one or more restraining assemblies may include both the first and second restraining mechanisms. Although carrier assembly 26 is shown to include two types of restraining assemblies, the carrier assembly may include restraining assemblies with only a single type, such as restraining assemblies with only the first restraining mechanism or with both the first and second restraining mechanisms, or with three or more types of restraining assemblies.

Although article carrier 20 and its components are shown and described in the context of supporting one or more bicycles, the carrier and/or one or more of its components may alternatively, or additionally, be used to support one or more other articles. For example, the carrier may be configured to support skis, snowboards, kayaks, storage containers, etc.

Although the article carrier and features of article carriers have been shown and described with reference to the foregoing operational principles and preferred embodiments, those skilled in the art will find apparent that various changes in form and detail may be made without departing from the spirit and scope of the claims. The present disclosure is intended to embrace all such alternatives, modifications, and variances that fall within the scope of the appended claims.

For example, the arm assemblies described above may be readily combined with alternative hitch mounted mast designs such as the swing-away rack design shown in U.S. Pat. No. 5,644,717 (incorporated by reference above).

We claim:

1. An article carrier configured to be detachably mounted to a trailer hitch of a vehicle, the vehicle having a longitudinal axis and the trailer hitch defining a hitch axis that is parallel to the longitudinal axis, the article carrier comprising:
 a base having a connector configured to be detachably mounted to the trailer hitch,
 a frame having first and second end portions with the first end portion being mounted to the base and extending upward generally perpendicular to the longitudinal axis of the vehicle, and
 a carrier assembly connected to the second end portion of the frame and configured to support one or more articles, wherein the carrier assembly is configured to be selectively pivoted about an axis that is perpendicular to the longitudinal axis of the vehicle, the carrier assembly including a pair of arms, each arm having a top portion with a plurality of depressions sized to receive a frame component of a bicycle, each of the arms further including a bottom portion having a slot and at least one restraining assembly configured to slide along the slot for selectively positioning the restraining assembly below a depression supporting the frame component of the bicycle, the restraining assembly having a strap for binding the frame component to the restraining assembly.

2. The article carrier of claim 1, wherein the restraining assembly further includes a stabilizer portion that is pivotal between a folded position and an extended position, the stabilizer portion also having an end portion and a strap associated with the end portion for binding a second frame component of the bicycle to the carrier assembly when the stabilizer portion is in the extended position.

3. The article carrier of claim 2, wherein the slot has a series of enlarged openings, the stabilizer portion having a head member dimensioned to fit in one of the enlarged openings of the slot, the stabilizer portion also having a cam surface which operates to urge the head member into one of the enlarged openings when the stabilizer portion is moved from the folded position to the extended position, the restraining assembly and corresponding stabilizer portion being prevented from moving in the slot of the arm when the stabilizer portion is in its extended position.

4. The article carrier of claim 1, wherein each arm is covered with an EVA foam pad forming a series of cradle surfaces for supporting a bicycle frame.

5. The article carrier of claim 1, wherein the frame is configured to rotate around an axis parallel to the longitudinal axis of the vehicle.

6. The article carrier of claim 1, wherein the arms are connected to each other by an axle having a middle portion, and a fin member fixedly attached to the middle portion of the axle, the carrier assembly being pivotally connected to the second end portion of the mast by a pivot mechanism configured to permit selective pivoting of the carrier assembly between a collapsed position in which the arms are substantially perpendicular to the longitudinal axis of the vehicle, and a use position in which the arms are substantially parallel to the longitudinal axis of the vehicle, wherein the pivot mechanism includes a switch device which is moveable between a locked position and a free position, the switch device being biased toward the locked position, wherein the pivot mechanism prevents rotation of the axle when the switch is in the locked position, by engaging the fin member.

7. The article carrier of claim 6, wherein the fin member has a first pin member, the switch device having a hook portion that engages the first pin member when the carrier assembly is in the collapsed position.

8. The article carrier of claim 7, wherein the switch device controls vertical movement of a second pin member along an axis perpendicular to the longitudinal axis of the vehicle, the fin member having a contact edge portion that contacts the second pin member when the switch device is in the locked position and the carrier assembly is in the use position, thereby preventing rotation of the axle, the second pin member moving out of contact with the contact edge portion of the fin member when the switch device is in the free position.

9. A bicycle carrier configured to be detachably mounted to a trailer hitch of a vehicle, the vehicle having a longitudinal axis and the trailer hitch defining a hitch axis that is parallel to the longitudinal axis, the bicycle carrier comprising:
 a base having a connector configured to be detachably mounted to the trailer hitch,
 a frame having first and second end portions with the first end portion being mounted to the base and extending upward generally perpendicular to the longitudinal axis of the vehicle, and
 a carrier assembly connected to the second end portion of the frame and configured to support one or more bicycles, the carrier assembly including a pair of arms, each arm having a top portion with a plurality of padded depressions sized to receive a frame component of a bicycle, each of the arms further including a bottom portion having a slot, each slot having a series of enlarged openings, a first one of the arms having a first restraining assembly, and the other of the pair of arms having a second restraining assembly, each of the first and second restraining assemblies engaging the corresponding slot in a respective arm and being slidable in the slot to alter the relative position of the restraining assembly along the respective arm.

10. The bicycle carrier of claim 9, wherein the carrier assembly is pivotal between a collapsed position in which the arms are substantially perpendicular to the longitudinal axis of the vehicle, and a use position in which the arms are substantially parallel to the longitudinal axis of the vehicle.

11. The bicycle carrier of claim 9, wherein the first restraining assembly further includes a stabilizer portion that is pivotal between a folded position and an extended position, the stabilizer portion also having an end portion and a strap associated with the end portion for binding a second frame component of the bicycle to the carrier assembly when the stabilizer portion is in the extended position.

12. The bicycle carrier of claim 11, wherein the stabilizer portion has a head member dimensioned to fit in one of the enlarged openings of the slot, the stabilizer portion also having a cam surface which operates to urge the head member into one of the enlarged openings when the stabilizer portion is moved from the folded position to the extended position, the restraining assembly and corresponding stabilizer portion being prevented from moving in the slot of the arm when the stabilizer portion is in its extended position.

13. The bicycle carrier of claim 9, wherein each arm is covered with an EVA foam pad forming a series of cradle surfaces for supporting a bicycle frame.

14. The bicycle carrier of claim 9, wherein the frame is configured to rotate around an axis parallel to the longitudinal axis of the vehicle.

15. The bicycle carrier of claim 9, wherein the arms are connected to each other by an axle having a middle portion, and a fin member fixedly attached to the middle portion of the axle, the carrier assembly being pivotally connected to the second end portion of the mast by a pivot mechanism configured to permit selective pivoting of the carrier assembly between a collapsed position in which the arms are substantially perpendicular to the longitudinal axis of the vehicle, and a use position in which the arms are substantially parallel to the longitudinal axis of the vehicle, wherein the pivot mechanism includes a switch device which is moveable between a locked position and a free position, the switch device being biased toward the locked position, wherein the pivot mechanism prevents rotation of the axle when the switch is in the locked position, by engaging the fin member.

16. The bicycle carrier of claim 15, wherein the fin member has a first pin member, the switch device having a hook portion that engages the first pin member when the carrier assembly is in the collapsed position.

17. The bicycle carrier of claim 16, wherein the switch device controls vertical movement of a second pin member along an axis perpendicular to the longitudinal axis of the vehicle, the fin member having a contact edge portion that contacts the second pin member when the switch device is in the locked position and the carrier assembly is in the use position, thereby preventing rotation of the axle, the second pin member moving out of contact with the contact edge portion of the fin member when the switch device is in the free position.

* * * * *